United States Patent
Takahashi et al.

(10) Patent No.: US 6,912,116 B2
(45) Date of Patent: Jun. 28, 2005

(54) ELECTROCHEMICAL DEVICE AND PROCESS FOR PRODUCING SAME

(75) Inventors: Tetsuya Takahashi, Tokyo (JP); Atsuko Kosuda, Tokyo (JP); Tadayoshi Iijima, Tokyo (JP)

(73) Assignee: TDK Corporation, Tokyo (JP)

( * ) Notice: Subject to any disclaimer, the term of this patent is extended or adjusted under 35 U.S.C. 154(b) by 65 days.

(21) Appl. No.: 10/400,624

(22) Filed: Mar. 28, 2003

(65) Prior Publication Data

US 2003/0231004 A1 Dec. 18, 2003

(30) Foreign Application Priority Data

Mar. 29, 2002 (JP) ........................................ 2002-093934

(51) Int. Cl.[7] ........................... H01G 9/00; H01M 10/18
(52) U.S. Cl. ...................... 361/502; 29/25.03; 429/210
(58) Field of Search ........................ 361/502; 29/25.03; 429/209–210, 232

(56) References Cited

U.S. PATENT DOCUMENTS

| | | | | |
|---|---|---|---|---|
| 4,862,328 A | * | 8/1989 | Morimoto et al. | 361/502 |
| 5,099,398 A | * | 3/1992 | Kurabayashi et al. | 361/502 |
| 6,134,760 A | * | 10/2000 | Mushiake et al. | 29/25.03 |
| 2002/0138958 A1 | * | 10/2002 | Nonaka et al. | 29/25.03 |

FOREIGN PATENT DOCUMENTS

| | | | |
|---|---|---|---|
| EP | 0974987 A1 * | 1/2000 | H01G/9/022 |
| JP | 4-162510 | 6/1992 | |
| JP | 6-53079 | 2/1994 | |
| JP | 8-55761 | 2/1996 | |
| JP | 2000-252175 | 9/2000 | |

\* cited by examiner

*Primary Examiner*—Eric Thomas
(74) *Attorney, Agent, or Firm*—Oblon, Spivak, McClelland, Maier & Neustadt, P.C.

(57) ABSTRACT

An electrochemical device includes electrodes stacked one on the other with a separator intervening between the adjacent electrodes. The electrode includes a current collector and an electrode layer stacked on the current collector via an adhesive resin layer. The electrode layer contains an active material, an electrically conductive auxiliary and a binder resin. At least part of the electrically conductive auxiliary or the active material penetrates the adhesive resin layer to establish an electrical connection with the current collector.

11 Claims, 1 Drawing Sheet

ELECTROCHEMICAL DEVICE AND PROCESS FOR PRODUCING SAME

BACKGROUND OF THE INVENTION

1. Field of the Invention

The present invention relates to an electrochemical device and a process for producing an electrochemical device.

2. Related Background Art

With the development and prevalence of portable electronic instruments, research is increasingly focused on secondary (or rechargeable) batteries such as lithium ion batteries having a high electric capacity capable of continuous operation for a long time and electrochemical devices such as electric double layer capacitors. Such an electrochemical device has a structure composed of electrodes that are stacked one on another with an electrolyte intervening between them. The electrode is composed of a current collector on the surface of which an electrode layer containing an active material is formed. The electrolyte is composed of a separator impregnated with an electrolyte.

In the electric double layer capacitor, a metal foil of aluminum, nickel, copper or stainless steel etc. or an electrically conductive resin is used as a material for the current collector. As an active material, an activated carbon that has a large specific surface area is generally used. The electrode is made by forming the electrode layer directly on the current collector. For example, Japanese Patent Application Laid-Open No. 4-162510 and Japanese Patent Application Laid-Open No. 8-55761 discloses electric double layer capacitors in which an electrode layer is formed by directly applying electrode coating liquid, which is in the form of slurry that is formed by mixing an active material and an electrically conductive auxiliary material with a solvent in which a binder resin is dissolved, to the surface of a current collector and thereafter drying it.

In the current collector that uses a metal foil as described above, there is a problem in adhesivity of the metal foil with the electrode layer, which sometimes causes an increase in the internal resistance or detachment of the electrode layer from the current collector, so that cycle properties would be deteriorated when charging and discharging are performed repeatedly. Especially, current collectors made of aluminum foils noticeably raise the problem of insufficient adhesivity with the electrode layer.

In addition, when the electrode layer is formed by applying electrode coating liquid to the collecting layer directly, it is necessary to increase the amount of the binder resin in order to enhance the adhesivity of the electrode layer to the current collector. This inevitably leads to a decrease in energy density.

On the other hand, there is also known electric double layer capacitors in which the electrode layer and the current collector are bonded to each other by providing an adhesive resin layer between them, instead of directly forming the electrode layer on the current collector. By bonding the electrode layer and the current collector with the adhesive resin, adhesivity of the electrode layer and the current collector can be enhanced. For example, Japanese Patent Application Laid-Open No. 6-53079 discloses an electric double layer capacitor in which an electrode layer that has been formed in advance is bonded to a current collector that also serves as an outer packaging material with an electrically conductive adhesive resin. In addition, Japanese Patent Application Laid-Open No. 2000-252175 discloses an electric double layer capacitor that is formed by providing a material that shows a fluid nature under application of heat, between the electrode layer and the current collector, applying heat under pressurization, and thereafter cooling it to bond the electrode layer and the current collector. In this electric double layer capacitor, the electrode is made by applying an adhesive resin made of powdered, meshed or porous polyethylene or the like to the current collector, and thereafter laminating the electrode layer. Then, a plurality of electrodes thus made are stacked one on another with a separator intervening between each two adjacent electrodes, and heat is applied from both sides of the electrodes under pressurization by a pressuring jig. The electrodes are maintained under this state for a while and then cooled down to room temperature. Thus, the electrode layer and the current collector are bonded to each other.

However, in the case in which the electrode and the current collector are bonded by an adhesive resin, there is a problem that the energy density is decreased due to the presence of thickness of the adhesive resin layer, which is necessitated by use of the adhesive resin. In addition, if an insulating material is used as a material for the adhesive layer, it is necessary to form the adhesive resin layer only in a limited area on the surface of the current collector, in view of an increase in the internal resistance. Therefore, it is difficult to provide sufficient adhesivity.

On the other hand, in the case in which an electric double layer capacitor is produced by providing an adhesive resin that shows a fluid nature under application of heat, heating it under pressurization and then cooling it, a complex manufacturing apparatus and a complex manufacturing process that includes heating under pressurization and cooling are required.

The above-described problem of insufficient adhesivity of an electrode layer and a current collector is shared not only by electric double layer capacitors but also by electrochemical devices such as secondary batteries that have structures including electrodes stacked with separators between. Therefore, in electrochemical devices having such structures, problems such as an increase in the internal resistance and deterioration in the energy density would arise, when an adhesive resin layer is provided in order to ensure adhesivity of an electrode layer and a current collector.

SUMMARY OF THE INVENTION

Therefore, an object of the invention is to provide electrochemical devices such as electric double layer capacitors and secondary batteries while ensuring adhesivity of a current collector and an electrode layer, enhancing cycle properties and reducing their internal resistances, without requiring a complicated manufacturing process.

An electrochemical device according to one aspect of the present invention includes electrodes stacked one on the other with a separator intervening between each two adjacent electrodes, wherein each electrode has a current collector and an electrode layer laminated on the current collector via an adhesive layer, the electrode layer contains an active material, an electrically conductive auxiliary and a binder resin, and at least a part of the electrically conductive auxiliary or the active material penetrates the adhesive resin layer to establish an electrical connection with the current collector.

In this electrochemical device, it is preferable that the thickness of the adhesive resin layer is not more than half of a particle diameter of the active material.

It is also preferable that the thickness of the adhesive resin layer is not more than half of a particle diameter of the active material.

In the electrochemical device according to this invention, it is preferable that the thickness of the adhesive resin layer is in a range of 0.02 to 1 $\mu$m.

In the electrochemical device according to this invention, it is preferable that the adhesive resin layer comprises a fluorine-containing resin.

In the electrochemical device according to this invention, it is preferable that the electrode layer is formed on a surface of the adhesive resin layer by a coating method.

In the electrochemical device according to this invention, it is preferable that the binder resin is of the same type as the material of said adhesive resin layer.

The electrochemical device according to the invention includes, for example, an electric double layer capacitor and a secondary battery.

According to another aspect of the present invention there is also provided a process for producing an electrochemical device including electrodes stacked one on the other with a separator intervening between each two adjacent electrodes, each electrode having a current collector and an electrode layer laminated on the current collector via an adhesive layer, comprising a step of forming the adhesive resin layer on a surface of the current collector, and a step of forming the electrode layer containing an active material, an electrically conductive auxiliary and a binder resin, on a surface of the adhesive resin layer.

In the above process according to the present invention, it is preferable that after the step of forming the electrode layer, a step of rolling the electrode is added.

It is preferable that the rolling process be performed by a calender roll at a linear pressure of 500 to 2000 kg·f/cm.

DETAILED DESCRIPTION OF THE PREFERRED EMBODIMENTS

In the following, an electric double layer capacitor as an embodiment of the electrochemical device and the process for manufacturing an electrochemical device according to the present invention will be described.

Figure 1:
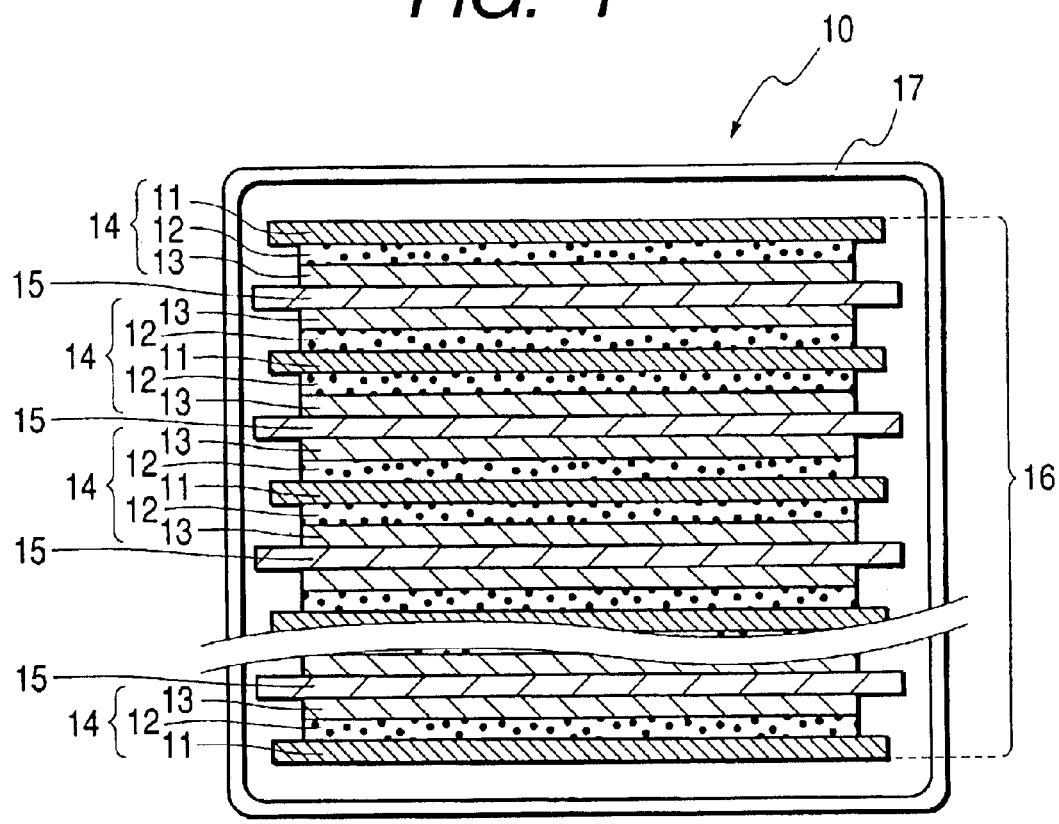
FIG. 1 is a cross sectional view showing an electric double layer capacitor as an embodiment of the present invention.
Figure 2:
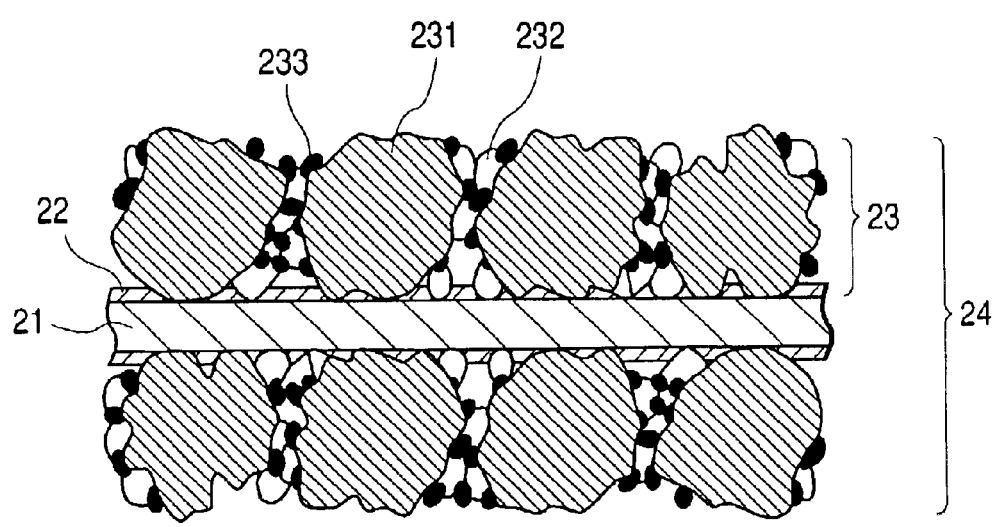
FIG. 2 is a cross sectional view showing a part of an electrode of the electric double layer capacitor as an embodiment of the present invention.

FIG. 1 is a cross sectional view showing an electric double layer capacitor as an embodiment of the present invention. The electric double layer capacitor according to this embodiment comprises an electrode set 16 accommodated in an outer packaging 17. The electrode set 16 is composed of electrodes 14 that are stacked one on another with separators 15 each of which is intervening between each two adjacent electrodes 14. Each electrode is composed of a current collector 11 on which an electrode layer(s) 13 is formed with an adhesive resin layer(s) 12 between. FIG. 2 is a cross sectional view showing a part of an electrode that is a constituent of the electric double layer capacitor according to this embodiment. The electrode 24 includes a current collector 21 and an electrode layer 23 that is formed on the current collector with an adhesive resin layer 22 between. The electrode layer contains active material 231, electrically conductive auxiliary material 232 and binder resin 233. Though the adhesive resin layer is a layer having an insulating nature, it has small defects that are generated when the adhesive resin layer 22 or the electrode layer 24 is formed. Therefore, at least a part of the active material 231 or the electrically conductive auxiliary material 232 penetrates the adhesive resin layer 22, so that an electrical connection is established between the electrode layer 23 and the current collector 21. In addition, after the electrode layer is formed, rolling processing is applied to the electrode, which further ensures the electrical connection between the electrode layer and the current collector. As a result, it is possible to reduce the internal resistance as well as to ensure the adhesivity between the current collector and the electrode layer.

It is preferable that the thickness of the adhesive resin layer is equal to or less than half of the particle diameter of the active material. This range of the thickness of the adhesive resin layer allows effective penetration of the active material through the adhesive resin layer. With this feature, the electrical connection between the electrode layer and the current collector can be established. When the thickness of the adhesive resin layer is beyond the above-mentioned range, it is difficult for the active material to penetrate the adhesive resin layer effectively, and an increase in the internal resistance will result. In connection with the above, the term "particle diameter of the active material" referred to herein means the average diameter of the active material particles when the active material is in a particulate form, while when the active material is in a fibrous form, it means the larger one of the average diameter and the average length of the active material fibers. When the active material has other forms such as a needle-like form or planiform, the term "particle diameter" means the average of the largest diameters.

Furthermore, it is preferable that the thickness of the adhesive resin layer is equal to or less than half of the particle diameter of the electrically conductive auxiliary material. In this invention, the electrical connection between the electrode layer and the connecting material can be established by penetration through the adhesive resin layer, of at least a part of the active material or the electrically conductive auxiliary material contained in the electrode layer. In the case in which the particle diameter of the electrically conductive auxiliary material is larger than that of the active material, the above-mentioned range of thickness of the adhesive resin layer allows effective penetration of the electrically conductive auxiliary material through the adhesive resin layer. With this feature, the electrical connection between the electrode layer and the current collector can be established. When the thickness of the adhesive resin layer is beyond the above-mentioned range, it is difficult for the electrically conductive auxiliary material to penetrate the adhesive resin layer effectively, and an increase in the internal resistance will result. In connection with the above, in this specification, the term "particle diameter of the electrically conductive auxiliary material" refers to the average diameter of the electrically conductive auxiliary material particles, when the electrically conductive auxiliary material is in a particulate form. When the electrically conductive auxiliary material has other forms, the term "particle diameter" means the average of the largest diameters.

It is preferable that the thickness of the adhesive resin layer is in the range of 0.02 $\mu$m to 1 $\mu$m. If the thickness of the adhesive resin layer is within this range, the high adhesivity between the electrode layer and the current collector can be realized. In addition, this range of the adhesive resin layer allows effective penetration of the active material or the electrically conductive auxiliary material through the adhesive resin layer, so that an electrical connection between the electrode layer and the current collector can be ensured. Consequently, the internal resistance can be made low. When the thickness of the adhesive resin layer is larger than the upper limit of the above-mentioned range, it is difficult for the active material to penetrate the adhesive resin layer effectively, and an increase in the internal resistance will result. On the other hand, when the thickness of the adhesive resin layer is smaller than the lower limit of the above-mentioned range, the adhesivity would be poor.

The thickness of the adhesive resin layer and the particle diameter of the active material of an electrochemical device can be inspected by observing a cross section of an electrode of the finished device by means of an electron microscope or the like. In addition, electrochemical devices according to the present invention can be easily distinguished from conventional electrochemical devices by such an observation, since a structure in which active material or electrically conductive auxiliary material penetrates through an adhesive resin layer to be in contact with a current collector will be observed.

The adhesive resin layer may be made of various resins. However, it is preferable that the adhesive resin layer is made of a fluorine-containing resin such as a poly vinylidene fluoride (PVDF) or a fluorine rubber, in view of their high adhesivity with a current collector and their resistance to electrolytes.

The method of manufacturing an electrochemical device according to the present embodiment includes a step of forming an adhesive resin layer on the surface of a current collector. The adhesive layer is formed by dissolving an adhesive resin in a solvent to prepare an adhesive resin coating liquid and applying it to the current collector. It is preferable that the solvent is a good solvent for the adhesive resin. With a good solvent for the adhesive resin, it is possible to obtain an adhesive resin coating liquid in which the adhesive resin is dissolved in the solvent uniformly.

The current collector may be made of a metal foil such as aluminum, nickel, copper or stainless steel or an electrically conductive resin.

The applying method may be a metal mask printing process, an electrostatic coating process, a dip coating process, a spray coating process, a roll coating process, a doctor blade process, a gravure coating process, screen printing process, etc.

The electrode layer is formed on the surface of the current collector with the adhesive resin layer between. The electrode layer is composed of an active material, an electrically conductive auxiliary material and a binder resin for binding them.

The materials for the components of the electrode layer may be selected from known materials. The active material may be a carbonic material. In particular, activated carbon is a preferable material for its large specific surface area. The electrically conductive auxiliary material, which is added as circumstances demand, may be a carbonic material such as graphite, carbon black and carbon fiber, or a metal material such as nickel, aluminum, copper or silver. Especially, graphite and carbon black are preferable for their chemical stability. There is no particular requirement for the material for the binder resin, and it may be any resin unless it is easily dissolved or reacts to change its nature in the electrolyte solution. However, materials of the same kind as the material of the adhesive resin layer are especially preferable. When the material of the binder resin is of the same kind as the material of the adhesive resin layer, the adhesivity of the electrode layer and the adhesive resin layer can be enhanced.

The process for producing an electrochemical device according to the present embodiment includes a step of forming the electrode layer including an active material, an electrically conductive auxiliary material and a binder resin on the surface of the adhesive resin layer by a coating method.

In the process of forming the electrode layer, an electrode coating liquid is first prepared by mixing an active material, an electrically conductive auxiliary material, which is added as circumstances demand, and a binder resin with a solvent. Next, the electrode coating liquid is applied to the surface of the adhesive resin layer that has been formed on the current collector, and thereafter it is dried. With the above-described process, an electrode is produced in which the electrode layer is made integral with the current collector with the resin layer between.

The solvent used for the electrode coating liquid includes a poor solvent to the material of the adhesive resin layer by 50 to 100%, and preferably 90 to 100%. With use of such a solvent, the adhesive layer does not dissolve in the electrode coating liquid, and the adhesivity of the electrode layer and the current collector can be ensured after the coating liquid is dried.

It is preferable that the solvent used for the electrode coating liquid has a high boiling point. That is because solvents having low boiling points will vaporize upon mixing, and so its operability is not good.

There is no particular requirement for the electrode coating material applying method, and various coating methods can be used as in the case of the adhesive resin layer.

After the electrode layer is formed, it is preferable to perform a rolling on the electrode. The rolling may be performed under room temperature or under a heated condition. The rolling may be performed by flat plate press or calender rolling technology. By adding a rolling process, the active material or the electrically conductive auxiliary material included in the electrode layer can effectively penetrate the adhesive resin layer so as to be in contact with the current collector.

It is preferable for the rolling process to be performed by the calender roll method, with a linear pressure of 500 to 2000 kg·f/cm. In the calender roll method, the electrode is inserted between a pair of smooth rolls and a prescribed linear pressure is applied to it. By performing rolling with the calender roll method at a linear pressure within the above-mentioned range, the active material or the electrically conductive auxiliary material penetrates the adhesive resin material so as to be in contact with the current collector for sure, so that a sufficient electrical connection can be established. If the linear pressure is lower than the lower limit of the above-mentioned range, the conductivity between the active material and the electrically conductive auxiliary material is not sufficient, which results in an increase in the internal resistance. On the other hand, if the linear pressure is higher than the upper limit of the above-mentioned range, the electrode is liable to be damaged.

The electrode produced as described above is punched into a prescribed shape. A plurality of electrodes thus made are stacked one on another with a separator being inserted between each two adjacent electrodes, so that an electrode set is produced. The electrodes may be rolled into a jelly roll shape with a separator between to form an electrode set.

The separator may be a porous film. Specifically, it may be a uniaxially or biaxially oriented film made of a laminated film or mixture of polyolefin such as polyethylene or polypropylene or a fibrous nonwoven fabric made of cellulose, polyester or polypropylene etc.

The electrode set is accommodated in an outer packaging, and then the electrode set is impregnated with an electrolyte. The process of impregnating the electrode set with the electrolyte may be performed before the electrode set is accommodated in the outer packaging.

There is no particular requirement for the material and shape of the outer packaging. The material of the outer packaging may be a metal such as iron or aluminum and the shape of the outer packaging may be a can-like shape, a cylindrical shape or a square shape.

The electrolyte may be an aqueous electrolyte such as sulfuric acid or a nonaqueous electrolyte made by dissolving an salt in a nonaqueous solvent. The salt may be $(C_2H_5)_4NBF_4$, $(C_2H_5)_3CH_3NBF_4$, or $(C_2H_5)_4PBF_4$ etc., or a mixture of any of these salts. The nonaqueous solvent may be propylene carbonate, ethylene carbonate, γ-butyl lactone, acetonitrile, dimethylformamide, 1,2-dimethoxyethane or sulfolane, or a mixture of any of these nonaqueous solvents.

Lithium Secondary Battery

The electrochemical device according to this embodiment can be a lithium secondary battery. In the following a description will be made of such a lithium secondary battery.

The electrodes that constitute the positive and negative electrodes of the lithium secondary battery according to this embodiment are composed of electrode current collectors on which a positive electrode layer and a negative electrode layer are respectively formed with adhesive resin layers between.

The adhesive resin layer may be formed with the same material and by the same method as the above-described electric double layer capacitor.

As an active material in the negative electrode, a carbonic material, a lithium metal, a lithium alloy or an oxide material may be used. A carbonic material suitable for the active material of the negative electrode may be selected from, for example, mesocarbon micro beads (MCMB), natural or artificial graphite, resin calcined carbon material, carbon fibers, etc. The material for the current collector of the negative electrode may be copper, nickel, etc.

As an active material in the positive electrode, a metal oxide into/out of which lithium ion can be intercalated/deintercalated may be used. A metal oxide suitable for the active material of the positive electrode may preferably be a metal oxide that includes lithium, such as $LiCoO_2$, $LiMn_2O_4$, $LiNiO_2$, $LiV_2O_4$, etc. The current collector of the positive electrode may be aluminum etc.

As an electrically conductive auxiliary material, graphite, carbon black or carbon fiber, or alternatively, fine metal particles made of nickel, copper, aluminum, silver, etc. may be used. Among others, graphite and carbon black are especially preferable for their chemical stability.

The positive and negative electrodes can be produced by the same process as that for producing the above-described electric double layer capacitor. Therefore, an adhesive resin layer is first formed on a current collector. Various types of coating methods can be used for forming the adhesive resin layer. On the other hand, an electrode coating liquid is prepared by mixing an active material, an electrically conductive auxiliary material and a binder resin with a solvent. The electrode coating liquid is applied to the adhesive resin layer having been formed on the colleting member, and then it is dried. Thus, an electrode in which the electrode layer is made integral with the current collector with the adhesive layer between is produced.

After the electrode layer is formed, it is preferable to perform a rolling on the electrode. The rolling process may be performed by flat plate press or calender rolling technology.

It is preferable for the rolling process to be performed by the calender roll method, with a linear pressure of 500 to 2000 kg·f/cm. By performing rolling with the calender roll method at a linear pressure within the above-mentioned range, the active material or the electrically conductive auxiliary material penetrates the adhesive resin material so as to be in contact with the current collector for sure, so that a sufficient electrical connection can be established. If the linear pressure is lower than the lower limit of the above-mentioned range, the conductivity between the active material or the electrically conductive auxiliary material is not sufficient, which results in an increase in the internal resistance. On the other hand, if the linear pressure is higher than the upper limit of the above-mentioned range, the electrode is liable to be damaged.

Positive electrodes and negative electrodes produced in the above-described manner are stacked one on another or rolled, with a separator intervening between each two adjacent electrodes, so that an electrode set is produced. The separator may be made of the materials same as those mentioned above in connection with the electric double layer capacitor. However, it is preferable to use a separator that has a so-called shutdown function for shutting down, when electrodes are short-circuited, conduction of ions by utilizing generated heat.

Then, the electrode set is accommodated in an outer packaging, and thereafter the electrode set is impregnated with an electrolyte.

There is no particular requirement for the solvent of the electrolyte, as long as it is compatible with salts. In the case of lithium batteries, polar nonaqueous solvents that are not decomposed even under application of a high voltage can be preferably used for the electrolyte. Examples of such a solvent are carbonates such as ethylene carbonate (EC), propylene carbonate (PC), butylene carbonate, dimethyl carbonate, diethyl carbonate and ethyl methyl carbonate, cyclic ethers such as tetrahydrofuran (THF) and 2-methyl tetrahydrofuran, cyclic ethers such as 1,3-dioxolan and 4-methyl dioxolan, lactones such as γ-butyl lactone, and sulfolane. In addition, 3-methyl sulfolane, dimethoxyethane and ethyl diglyme may also be used.

As an electrolyte salt, a lithium salt such as $LiBF_4$, $LiPF_4$, $LiAsF_6$, $LiSO_3CF_3$, $LiClO_4$ or $LiN(SO_2CF_3)_2$ may be used.

EXAMPLES

The present invention will be more specifically described below on the basis of specific examples.

In the following, descriptions will be made of examples in the form of electric double layer capacitors that were manufactured in accordance with the present invention.

Example 1

(Formation of Adhesive Resin Layer)

A resin coating liquid was prepared by having an adhesive resin of a fluorine rubber (Viton-GF manufactured by Dupon) dissolved in a solvent of methyl ethyl ketone (MEK: boiling point=80° C.) with the weight ratio Viton-GF/MEK= 5/95. The methyl ethyl ketone solvent is a good solvent for the fluorine rubber as the adhesive resin. The resin coating liquid thus made was applied to the whole surface of an aluminum foil having a thickness of 20 μm serving as a current collector, so that an adhesive resin layer was formed. The thickness of the adhesive resin layer after the solvent was evaporated was about 0.08 μm.

(Formation of Electrode)

As an active material, activated carbon fiber having a specific surface area of about 1000 m²/g, a diameter of 10 μm and a length of about 30 μm was used. The particle diameter of this active material is 30 μm in accordance with the definition of the particle diameter, since the length is larger than the diameter. An electrode coating liquid was prepared by mixing activated carbon fiber serving as an active material, acetylene black serving as an electrically conductive auxiliary material, a fluorine rubber (Viton-GF manufactured by Dupont) serving as a binder resin and a solvent of N-methylpyrrolidone (which will be referred to as NMP: boiling point=204° C.) with the weight ratio activated carbon fiber/acetylene black/Viton-GF/NMP=84/6/10/120. The NMP solvent is a poor solvent for the fluorine rubber, that is, the adhesive resin and the binder resin.

Then, the electrode coating liquid was applied to the adhesive resin layer formed on the surface of the current collector, and thereafter the solvent was evaporated, so that an electrode layer is formed. Thus, an electrode sheet in which the electrode layer was made integral with the current collector with the resin layer between was produced.

The electrode sheet was rolled by calender roll method at room temperature with a linear pressure of 700 kg·f/cm. Furthermore, the electrode sheet was punched by a press machine into a prescribed size, so that electrodes were made.

An electrode set was produced by stacking the electrodes thus made with a separator being inserted between each two adjacent electrodes. The structures of the positive electrode and the negative electrode were the same. The separator used was unwoven fabric (TF4030 manufactured by NIPPON KODOSHI CORPORATION) having a thickness of 30 μm and an air permeability of 80 to 150 sec/100 cc.

(Preparation of Electrolyte)

An electrolyte was prepared by having tetraethylammonium salt (($C_2H_5$)$_4$NBF$_4$) serving as a salt dissolved in a solvent of propylene carbonate (PC) with a ratio of 1 mole/litter.

The above-mentioned electrode set was accommodated in an outer packaging made of an aluminum laminated film, and thereafter the electrode set was impregnated with the electrolyte, and the outer packaging was sealed. Thus, an electric double layer capacitor as example 1 was made. The designed electric capacitance of this electric double layer capacitor was 3F.

A cross-cut adhesion test (JIS K 5400) was performed on the electrode that was used for example 1 of the electric double layer capacitor so as to evaluate adhesivity of the electrode layer and the current collector. In connection with this, the results of the cross-cut adhesion test was evaluated in such a way that when the ratio of (the number of remaining samples)/(the number of tested samples) was equal to or more than 80%, the example was evaluated as "usable", and when that ratio is equal to or more than 90%, the example was evaluated as "good". These criteria also apply to the subsequent examples that will be presented below.

In addition, the impedance at 1 kHz of example 1 of the electric double layer capacitor was measured as the internal resistance. When the impedance was equal to or smaller than 5Ω, the example was evaluated as "usable", and when the impedance was equal to or smaller than 1Ω, the example was evaluated as "good". These criteria also apply to the subsequent examples.

Furthermore, in order to evaluate cycle properties of the example, charging and discharging operations between 0 and 2.5V were performed one hundred times at a constant current of 30 mA, and then the electric capacitance was measured to determine a change in the electric capacitance. When the change in the electric capacitance was equal to or smaller than 10%, the example was evaluated as "usable", and when the electric capacitance was equal to or smaller than 5%, the example was evaluated as "good". These criteria also apply to the subsequent examples.

The results of the above-mentioned tests and measurements are shown in Table 1.

TABLE 1

| Example 1 | | | Remarks |
|---|---|---|---|
| Adhesive resin layer | Material | Fluorine rubber | |
| | Layer thickness (μm) | 0.08 | |
| Rolling condition | Linear pressure of calender roll (kg · f/cm) | 700 | |
| Adhesivity evaluation | Cross-cut adhesion test (remaining samples/tested samples) | 100/100 | good |
| Internal resistance evaluation | Impedance (Ω) | 0.43 | good |
| Cycle property evaluation | Electric capacitance in 1st cycle (F) | 3 | |
| | Electric capacitance in 100th cycle (F) | 3 | |
| | Patio of change in electric capacitance (%) | 0 | good |

As seen from the result of the cross-cut adhesion test shown in Table 1, the adhesivity of the electrode layer and the current collector in example 1 was good or high. Since the adhesivity is high, example 1 maintained its electric capacitance even after one hundred cycles of charging and discharging. In other words, it has good cycle properties.

Example 2

Example 2 of the electric double layer capacitor was made by a process that is basically the same as the process for making example 1 except that the linear pressure of the calender roll during the rolling was set to 1400 kg·f/cm. The same tests and evaluations as those performed on example 1 were also performed on example 2. The results of the tests are shown in Table 2.

TABLE 2

| Example 2 | | | Remarks |
|---|---|---|---|
| Adhesive resin layer | Adhesive resin layer | Fluorine rubber | |
| | Layer thickness (μm) | 0.08 | |
| Rolling condition | Linear pressure of calender roll (kg · f/cm) | 1400 | |
| Adhesivity evaluation | Cross-cut adhesion test (remaining samples/tested samples) | 100/100 | good |
| Internal resistance evaluation | Impedance (Ω) | 0.27 | good |
| Cycle property evaluation | Electric capacitance in 1st cycle (F) | 3.1 | |
| | Electric capacitance in 100th cycle (F) | 3.1 | |
| | Ratio of change in electric capacitance (%) | 0 | good |

As seen from the result of the cross-cut adhesion test shown in Table 2, the adhesivity of the electrode layer and the current collector in example 2 was good or high, and therefore example 2 had good cycle properties. Since the electrode of example 2 had been rolled with a linear pressure of 1400 kg·f/cm, the impedance of example 2 was lower than the impedance of example 1. The reason for this is considered to be that with the relatively high linear pressure of the rolling, the active material or the electrically conductive auxiliary material were caused to be in contact with the current collector for sure and an efficient electrical connection between the electrode layer and the current collector were realized.

Example 3

Example 3 of the electric double layer capacitor was made by a process that is basically the same as the process for making example 1 except that the rolling process was omitted. The same tests and evaluations as those performed on example 1 were performed on example 3. The results of the tests are shown in Table 3.

TABLE 3

| Example 3 | | | Remarks |
|---|---|---|---|
| Adhesive resin layer | Adhesive resin layer | Fluorine rubber | |
| | Layer thickness (μm) | 0.08 | |
| Rolling condition | Linear pressure of calender roll (kg · f/cm) | — | |
| Adhesivity evaluation | Cross-cut adhesion test (remaining samples/tested samples) | 100/100 | good |
| Internal resistance | Impedance (Ω) | 0.56 | good |

TABLE 3-continued

| Example 3 | | | Remarks |
|---|---|---|---|
| evaluation | | | |
| Cycle property evaluation | Electric capacitance in 1st cycle (F) | 3 | |
| | Electric capacitance in 100th cycle (F) | 3 | |
| | Ratio of change in electric capacitance (%) | 0 | good |

As seen from the result of the cross-cut adhesion test shown in Table 3, the adhesivity of the electrode layer and the current collector in example 3 was good or high, and therefore example 3 had good cycle properties. Since the electrode of example 3 had not been rolled, the impedance of example 3 was higher than the impedance of example 1. However, it is apparent that the active material or the electrically conductive auxiliary material in example 3 penetrated through defects in the adhesive resin layer, and that the electrical connection between the electrode layer and the current collector were established, though rolling processing had not been performed.

Example 4

Example 4 of the electric double layer capacitor was made by a process that is basically the same as the process for making example 1 except that the adhesive resin layer was formed with a thickness of 1.5 µm. The same tests and evaluations as those performed on example 1 were performed on example 4. The results of the tests are shown in Table 4.

TABLE 4

| Example 4 | | | Remarks |
|---|---|---|---|
| Adhesive resin layer | Adhesive resin layer | Fluorine rubber | |
| | Layer thickness (µm) | 1.5 | |
| Rolling condition | Linear pressure of calender roll (kg · f/cm) | 700 | |
| Adhesivity evaluation | Cross-cut adhesion test (remaining samples/tested samples) | 100/100 | good |
| Internal resistance evaluation | Impedance (Ω) | 1.64 | usable |
| Cycle property evaluation | Electric capacitance in 1st cycle (F) | 3 | |
| | Electric capacitance in 100th cycle (F) | 3 | |
| | Ratio of change in electric capacitance (%) | 0 | good |

As seen from the result of the cross-cut adhesion test shown in Table 4, example 4 had a high adhesivity of the electrode layer and the current collector, and therefore example 4 had good cycle properties. Since the adhesive resin layer was thick, the impedance of the example 4 was higher than 1Ω, which is the criterion for a good impedance. However, the impedance was smaller than 5Ω, namely, it was considered to be in the usable range.

Example 5

Example 5 of the electric double layer capacitor was made by a process that is basically the same as the process for making example 1 except that the adhesive resin layer was formed with a thickness of 10 µm. The same tests and evaluations as those performed on example 1 were performed on example 5. The results of the tests are shown in Table 5.

TABLE 5

| Example 5 | | | Remarks |
|---|---|---|---|
| Adhesive resin layer | Adhesive resin layer | Fluorine rubber | |
| | Layer thickness (µm) | 10 | |
| Rolling condition | linear pressure of calender roll (kg · f/cm) | 700 | |
| Adhesivity evaluation | Cross-cut adhesion test (remaining samples/tested samples) | 100/100 | good |
| Internal resistance evaluation | Impedance (Ω) | 2.78 | usable |
| Cycle property evaluation | Electric capacitance in 1st cycle (F) | 2.9 | |
| | Electric capacitance in 100th cycle (F) | 2.9 | |
| | Ratio of change in electric capacitance (%) | 0 | good |

As seen from the result of the cross-cut adhesion test shown in Table 4, example 5 had a high adhesivity of the electrode layer and the current collector, and therefore example 5 had good cycle properties. As mentioned above, the thickness of the adhesive resin layer was 10 µm. This was smaller than half of the particle diameter 30 µm, and therefore example 5 was determined usable, though it has a relatively high impedance.

Example 6

Example 6 of the electric double layer capacitor was made by a process that is basically the same as the process for making example 1 except that the adhesive resin layer was formed with a thickness of 20 µm. The same tests and evaluations as those performed on example 1 were performed on example 6. The results of the tests are shown in Table 6.

TABLE 6

| Example 6 | | | Remarks |
|---|---|---|---|
| Adhesive resin layer | Adhesive resin layer | Fluorine rubber | |
| | Layer thickness (µm) | 20 | |
| Rolling condition | Linear pressure of calender roll (kg · f/cm) | 700 | |
| Adhesivity evaluation | Cross-cut adhesion test (remaining samples/tested samples) | 100/100 | good |
| Internal resistance evaluation | Impedance (Ω) | 4.85 | usable |
| Cycle property evaluation | Electric capacitance in 1st cycle (F) | 2.8 | |
| | Electric capacitance in 100th cycle (F) | 2.8 | |
| | Ratio of change in electric capacitance (%) | 0 | good |

As seen from the result of the cross-cut adhesion test shown in Table 6, example 6 showed a high adhesivity of the electrode layer and the current collector, and therefore example 6 had good cycle properties. As mentioned above, the thickness of the adhesive resin layer was 20 µm. This was larger than half of the particle diameter 30 µm, and therefore example 6 had a high impedance, though it was within the usable range of less than 5Ω.

Example 7

Example 7 of the electric double layer capacitor was made by a process that is basically the same as the process for making example 1 except that the adhesive resin layer was formed with a thickness of 20 µm and the linear pressure of the calender roll during the rolling was set to 1400 kg·f/cm. The tests and evaluations same as those performed on example 1 were performed on example 7. The results of the tests are shown in Table 7.

TABLE 7

| Example 7 | | | Remarks |
|---|---|---|---|
| Adhesive resin layer | Adhesive resin layer | Fluorine rubber | |
| | Layer thickness (µm) | 20 | |
| Rolling condition | Linear pressure of calender roll (kg · f/cm) | 1400 | |
| Adhesivity evaluation | Cross-cut adhesion test (remaining samples/tested samples) | 100/100 | good |
| Internal resistance evaluation | Impedance (Ω) | 0.95 | good |
| Cycle property evaluation | Electric capacitance in 1st cycle (F) | 3 | |
| | Electric capacitance in 100th cycle (F) | 3 | |
| | Ratio of change in electric capacitance (%) | 0 | good |

As seen from the result of the cross-cut adhesion test shown in Table 7, example 7 showed a high adhesivity of the electrode layer and the current collector, and therefore example 6 had good cycle properties. As mentioned above, the thickness of the adhesive resin layer was 20 µm, which was larger than half of the particle diameter 30 µm. However, with the calender roll linear pressure of 1400 kg·f/cm, the impedance was smaller than 1Ω, which was considered as good.

As per the above, even if the adhesive resin layer is thick, it is possible to cause the active material or the electrically conductive auxiliary material to penetrate the adhesive layer to establish an electrical connection between the electrode layer and the current collector to reduce the impedance by setting appropriate conditions for the linear pressure of the calender roll.

Example 8

Example 8 of the electric double layer capacitor was made by a process that is basically the same as the process for making example 1 except that PVDF was used as the material for the adhesive resin layer.

In the formation of the adhesive resin layer, a resin coating liquid was first prepared by dissolving PVDF as an adhesive resin in a solvent of N-methyl pyrrolidone, which is a good solvent for PVDF with a weight ratio PVDF/NMP=5/95. Then the resin coating liquid was applied to the surface of a current collector with a bar coater, so that the adhesive resin layer was formed. The thickness of the adhesive resin layer after the solvent was evaporated was about 0.08 µm. The electrode coating liquid used for this example was the same as the electrode coating liquid used for example 1. In this electrode coating liquid, the NMP solvent is a good solvent for the adhesive resin of PVDF.

The same tests and evaluations as those performed on example 1 were performed on example 8. The results of the tests are shown in Table 8.

TABLE 8

| Example 8 | | | Remarks |
|---|---|---|---|
| Adhesive resin layer | Adhesive resin layer | PVDF | |
| | Layer thickness (µm) | 0.08 | |
| Rolling condition | Linear pressure of calender roll (kg · f/cm) | 700 | |
| Adhesivity evaluation | Cross-cut adhesion test (remaining samples/tested samples) | 85/100 | usable |
| Internal resistance evaluation | Impedance (Ω) | 0.48 | good |
| Cycle property evaluation | Electric capacitance in 1st cycle (F) | 3 | |
| | Electric capacitance in 100th cycle (F) | 2.8 | |
| | Ratio of change electric capacitance (%) | 6.7 | usable |

As seen from the result of the cross-cut adhesion test shown in Table 8, example 8 that had an adhesive resin layer made of PVDF showed a lower adhesivity as compared to the other examples that had adhesive resin layers made of fluorine rubber. Since the adhesivity of the electrode layer and the current collector made of aluminum was relatively low, the electric capacitance after one hundred cycles of charging and discharging decreased, and therefore its cycle properties were relatively poor. However, the change or decrease of the electric capacitance was less than 10%, and it was evaluated as usable.

Control Example 1

Control example 1 of the electric double layer capacitor was made by a process that is basically the same as the process for making example 1 except that the electrode layer was formed directly on the current collector without an intervening adhesive resin layer and rolling was not performed on the electrode. The same tests and evaluations as those performed on example 1 were performed on control example 1. The results of the tests are shown in Table 9.

TABLE 9

| Control example 1 | | | Remarks |
|---|---|---|---|
| Adhesive resin layer | Adhesive resin layer | — | |
| | Layer thickness (µm) | — | |
| Rolling condition | Linear pressure of calender roll (kg · f/cm) | — | |
| Adhesivity evaluation | Cross-cut adhesion test (remaining samples/tested samples) | 60/100 | unusable |
| Internal resistance evaluation | Impedance (Ω) | 1.02 | usable |
| Cycle property evaluation | Electric capacitance in 1st cycle (F) | 2.7 | |
| | Electric capacitance in 100th cycle (F) | 0.5 | |
| | Ratio of change in electric capacitance (%) | 81.5 | unusable |

As seen from the result of the cross-cut adhesion test shown in Table 9, control example 1, in which an adhesive layer was not provided, showed quite a poor adhesivity between the electrode layer and the current collector. The impedance of control example 1 was high though it was evaluated as usable. In addition, the electric capacitance was badly deteriorated after one hundred cycles of charging and discharging, and the cycle properties were evaluated as unusable. It is considered that the deterioration of the cycle properties was caused by detachment of the active material from the current collector.

Control Example 2

Control example 2 of the electric double layer capacitor was made by a process that is basically the same as the process for making example 1 except that the adhesive resin layer was formed with a thickness of 20 μm and rolling was not performed on the electrode. The same tests and evaluations as those performed on example 1 were performed on control example 2. The results of the tests are shown in Table 10.

TABLE 10

| Control example 2 | | | Remarks |
|---|---|---|---|
| Adhesive resin layer | Adhesive resin layer | Fluorine rubber | |
| | Layer thickness (μm) | 20 | |
| Rolling condition | Linear pressure of calender roll (kg · f/cm) | — | |
| Adhesivity evaluation | Cross-cut adhesion test (remaining samples/tested samples) | 100/100 | good |
| Internal resistance evaluation | Impedance (Ω) | 19.2 | unusable |
| Cycle property evaluation | Electric capacitance in 1st cycle (F) | 2.3 | |
| | Electric capacitance in 100th cycle (F) | 2.3 | |
| | Ratio of change in electric capacitance (%) | 0 | good |

As seen from the result of the cross-cut adhesion test shown in Table 9, control example 2 showed a high adhesivity between the electrode layer and the current collector, and therefore control example 2 maintained its electric capacitance even after one hundred cycles of charging and discharging. However, the impedance of control example 2 was high, and it was evaluated as unusable.

While in the foregoing, preferred embodiments and examples of the present invention have been described, they are not intended to restrict the present invention. It is apparent that a person skilled in the art could think of various changes or modification to them within the scope of the annexed claims, and such changes and modifications also fall under to the scope of the technology defined by the present invention.

What is claimed is:

1. An electrochemical device comprising:
   electrodes stacked one on the other with a separator intervening between each two adjacent electrodes, each electrode having a current collector and an electrode layer laminated on the current collector via an adhesive resin layer, wherein
   said electrode layer contains an active material, an electrically conductive auxiliary material, and a binder resin, and
   at least a part of said electrically conductive auxiliary material or said active material penetrates said adhesive resin layer to directly come into contact with said current collector, establishing an electrical connection therebetween.

2. An electrochemical device according to claim 1, wherein a thickness of said adhesive resin layer is not more than half of a particle diameter of said active material.

3. An electrochemical device according to claim 1, wherein a thickness of said adhesive resin layer is not more than half of a particle diameter of said electrically conductive auxiliary material.

4. An electrochemical device according to claim 1, wherein a thickness of said adhesive resin layer is in a range of 0.02 to 1 μm.

5. An electrochemical device according to claim 1, wherein said adhesive resin layer comprises a fluorine-containing resin.

6. An electrochemical device according to claim 1, wherein said electrode layer is formed on a surface of said adhesive resin layer by a coating method.

7. An electrochemical device according to claim 1, wherein said binder resin is of the same type as the material of said adhesive resin layer.

8. An electrochemical device according to claim 1, wherein said electrochemical device is an electric double layer capacitor.

9. An electrochemical device according to claim 1, wherein said electrochemical device is a secondary battery.

10. A process for producing an electrochemical device comprising electrodes stacked one on the other with a separator intervening between each two adjacent electrodes, each electrode having a current collector and an electrode layer laminated on the current collector via an adhesive layer, the process comprising the steps of:
   forming the adhesive resin layer on a surface of the current collector; and
   forming the electrode layer containing an active material, an electrically conductive auxiliary material, and a binder resin, on a surface of the adhesive resin layer; and
   rolling the electrode such that at least part of said electrically conductive auxiliary material or said active material penetrates said adhesive resin layer to establish a direct contact with the current collector to establish an electrical connection with the current collector.

11. A process for producing an electrochemical device according to claim 10, wherein said step of rolling is performed by a calender roll at a linear pressure of 500 to 2000 kg·f/cm.

* * * * *